(12) United States Patent
Dashora et al.

(10) Patent No.: US 7,792,975 B1
(45) Date of Patent: Sep. 7, 2010

(54) APPLICATION SESSION MANAGEMENT IN NETWORKING DEVICES

(75) Inventors: Vinod Dashora, Fremont, CA (US); Subramanian Srinivasan, San Jose, CA (US); Sandeep Kumar, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 147 days.

(21) Appl. No.: 11/717,504

(22) Filed: Mar. 12, 2007

(51) Int. Cl.
G06F 15/16 (2006.01)
(52) U.S. Cl. .................. 709/228; 709/203; 709/227
(58) Field of Classification Search .......... 709/203, 709/228, 238
See application file for complete search history.

(56) References Cited

U.S. PATENT DOCUMENTS

| | | | | |
|---|---|---|---|---|
| 2003/0115333 A1* | 6/2003 | Cohen et al. | ............. | 709/227 |
| 2005/0034066 A1* | 2/2005 | Ahlert et al. | ............. | 715/517 |
| 2006/0155862 A1* | 7/2006 | Kathi et al. | ............. | 709/229 |
| 2006/0167975 A1* | 7/2006 | Chan et al. | ............. | 709/203 |
| 2006/0265720 A1* | 11/2006 | Cai et al. | ............. | 719/330 |
| 2006/0288208 A1 | 12/2006 | Dashora et al. | | |
| 2007/0005786 A1* | 1/2007 | Kumar et al. | ............. | 709/230 |
| 2007/0005801 A1 | 1/2007 | Kumar et al. | | |
| 2008/0016242 A1* | 1/2008 | Panec et al. | ............. | 709/238 |
| 2008/0144655 A1* | 6/2008 | Beam et al. | ............. | 370/466 |

OTHER PUBLICATIONS

Anonymous, "OASIS Security Services (SAML) TC," downloaded Nov. 26, 2007 from http://www.oasis-open.org/committees/tc_home.php?wg_abbrev=security, published by Organization for the Advancement of Structured Information Standards, Billerica, MA US, 7 pages.

Anonymous, "OASIS Web Services Secure Exchange (WS-SX) TC," downloaded Nov. 26, 2007 from http://www.oasis-open.org/committees/tc_home.php?wg_abbrev=ws-sx, published by Organization for the Advancement of Structured Information Standards, Billerica, MA US, 3 pages.

Cabrera L F et al., Web Services Business Activity Framework (WS-BusinessActivity), published by xmlsoap.org, Aug. 2005, 23 pages.

* cited by examiner

*Primary Examiner*—Ramy M Osman
(74) *Attorney, Agent, or Firm*—Hickman Palermo Truong & Becker LLP (57) ABSTRACT

A networking device comprises an interface configured to receive and transmit data from and to a network; policy data configured to specify, for one or more application-layer messages, a session key that uniquely identifies an application session associated with the application-layer messages; logic encoded in one or more media for execution and when executed operable to receive a particular application-layer message through the interface, generate a particular session key for the particular application-layer message based on the policy data, and provide the particular session key to a message processing function.

32 Claims, 4 Drawing Sheets

APPLICATION SESSION MANAGEMENT IN NETWORKING DEVICES

FIELD OF THE INVENTION

The present disclosure generally relates to managing computer program application sessions across a network.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Computer program applications in an enterprise networked environment often interact with other applications and users on behalf of a user or an application. As a part of such interactions, the applications may need to maintain data about sessions of applications and users. Session data may be used by applications to store any state information that is relevant to the application or its interaction with a user or system. For example, an application may first authenticate a user before it allows other requests from the same user. If a user has not authenticated before making a request, such request may be denied or may fail. Information about whether a particular user is authenticated may be stored in session data. Session data also may be used to provide any user or application personalization, context-aware responses, or configuration.

A computer network normally comprises end station devices that are interconnected using network infrastructure devices. Examples of end station devices include server computers, personal computers, and printers. Examples of network infrastructure devices, also termed networking devices, are routers, switches, bridges and hubs. Typically, session information is managed and stored only by application endpoints or hosts, such as server computers.

If application needs to offload any function to another host or network element, then the application normally needs to provide necessary context information so that the offloaded function can be performed properly. Session data can provide the context information. For example, if an application offloads security operations (e.g., authentication and authorization), monitoring functions, or other operations to a network element, then the application also needs to provide information about the session or context in which such a function is to be performed.

In past approaches, applications have created and maintained session and context information and providing the information to the host where the information is used. For example, web servers create and store cookies on client computers, and browsers at the client computers use such cookies to keep the context of user operations in an HTTP session. This example involves information that is application specific and does not involve an offloaded function.

In past approaches, session or application context has been created in load balancing application requests based on the target destination and resource URI. However, such load balancing context information is created using only the protocol header fields of a client request. Certain application servers such as the Tomcat server perform session management based on the HTTP protocol only. Further, some protocols do not include widely used mechanisms for storing information in protocol headers of messages, and any useful context information is found only in the content payloads of the messages.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Application session management in networking devices is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Implementation Mechanisms—Hardware Overview
4.0 Extensions and Alternatives
1.0 General Overview In an embodiment, a networking device comprises an interface configured to receive and transmit data from and to a network; policy data configured to specify, for one or more application-layer messages, a session key that uniquely identifies an application session associated with the application-layer messages; and logic encoded in one or more media for execution and when executed operable to receive a particular application-layer message through the interface, generate a particular session key for the particular application-layer message based on the policy data, and provide the particular session key to a message processing function.

In one embodiment, the device comprises a switch or a router for use in a packet-switched network. In another embodiment, the device comprises a cache configured to store a plurality of session keys for different application sessions. In another embodiment, the device comprises the message processing function.

In another embodiment, the logic when executed is operable to generate a session object representing the application session and to provide the session object to the message processing function. In yet another embodiment, the policy data comprises a regular expression configured to match one or more data fields in a payload of the application-layer messages.

In a further embodiment, the policy data comprises a regular expression configured to match one or more data fields in a payload of the application-layer messages, and wherein the logic is operable to generate the particular session key for the particular application-layer message using a result of matching the regular expression to the data fields.

In yet another embodiment, the policy data comprises an XPath expression configured to match one or more data fields in an Extensible Markup Language (XML) payload of the application-layer messages, and wherein the logic is operable to generate the particular session key for the particular application-layer message using a result of matching the XPath expression to the data fields.

In other embodiments, the invention encompasses a method, logic and a computer-readable medium configured to implement the foregoing structure. Other features and embodiments will become apparent from the complete disclosure and claims herein.

2.0 Structural and Functional Overview

In an embodiment, a networking device provides for creating and maintaining application-aware session data, and to store application-specific contextual information that can be used by offloaded application functions. Further, the lifetime of such application aware sessions can be administratively configured.

Figure 1:
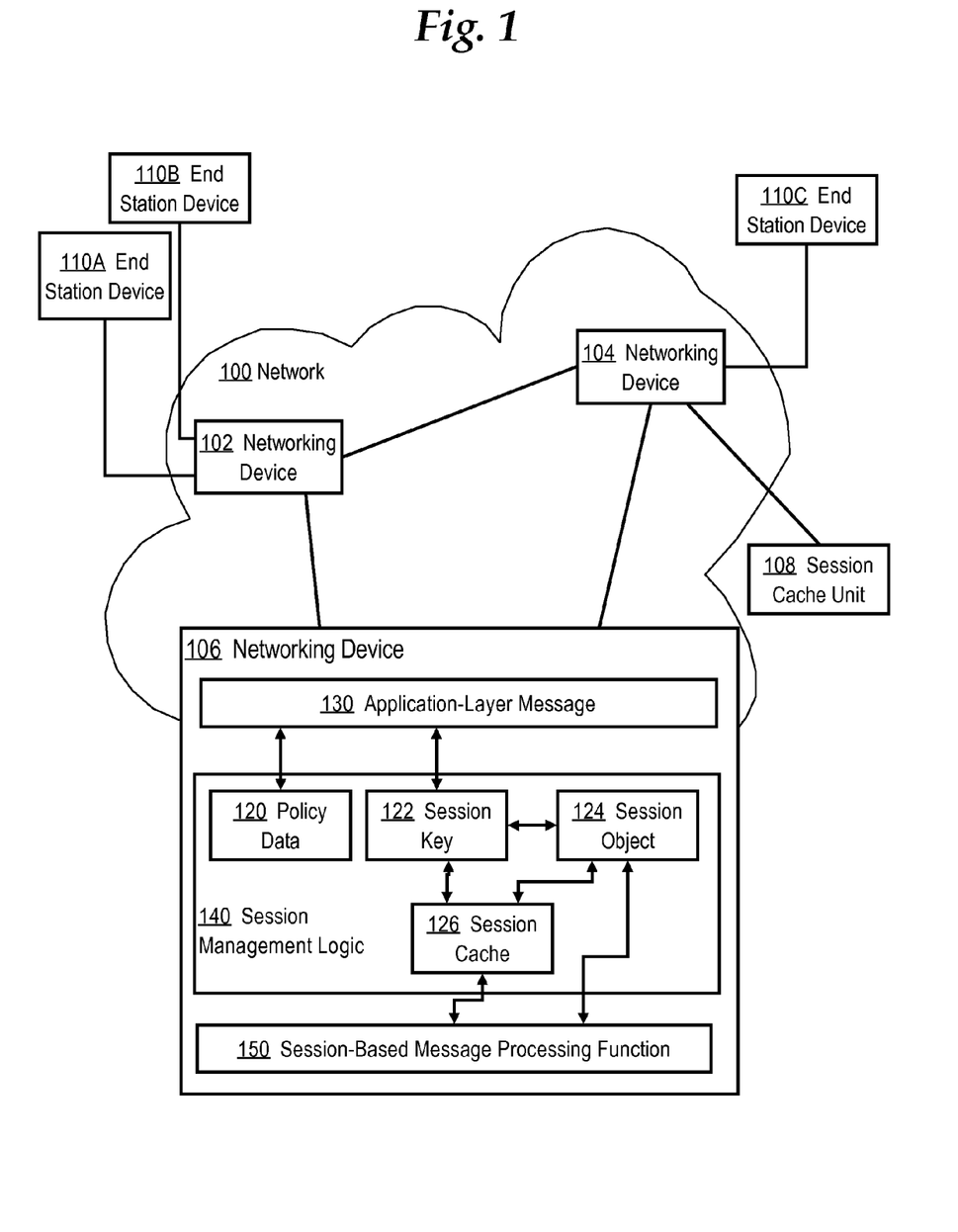
FIG. 1 illustrates a computer network including a networking device with application-aware session management logic.

FIG. 1 illustrates a computer network including a networking device with application-aware session management logic. A network 100 comprises a plurality of networking devices 102, 104, 106, each of which comprises a router, switch, bridge, hub, or other network infrastructure element. The networking devices 102, 104, 106 may be coupled to one another to form routing and forwarding paths. A fully-meshed topology is shown in FIG. 1, but other networks may use other topologies.

One or more end station devices 110A, 110B, 110C are coupled to the networking devices 102, 104. End station devices 110A, 110B, 110C comprise servers, workstations, personal computers, printers, etc.

Networking device 106 comprises session management logic 140 that can operate in connection with application-layer messages 130 that the networking device receives over the network 100. In this context, an application-layer message 130 comprises a unit of data that is related at Layer 5, 6, or 7 of the Open Systems Interconnect (OSI) network reference model. An application-layer message 130 is distinct from data frames, segments and packets that relate to OSI Layer 2, 3, or 4.

Session management logic 140 comprises policy data 120, one or more session keys 122, one or more session objects 124, and a session cache 126. The policy data 120 comprises one or more declarative policy statements that define how to construct a session key from information that is received in a particular application-layer message. The policy data 120 may define a particular session key based upon transport-specific information and application-specific parameters or information. For example, a session policy can be defined to create a session key using one or more the following parameters:

1. A combination of source IP address, destination IP address, source port value, and destination port value.

2. If the application-layer message 130 relates to a web application or service, then the session policy data 120 can specify that the application message URI is used to generate the session key 122.

3. Session policy data can use specific header value from a protocol header, such as an HTTP cookie, or an application-specific header value.

4. Session policy data can use a specific data value which can be retrieved from the application message header. For example, when the application-layer message 130 relates to a SOAP service, then the policy data 120 can specify that the session key 122 is derived from a user ID from a SAML assertion or Username Token in the message. Alternatively, policy data 120 can specify deriving a session key 122 from a JMS header.

Session policy data 120 can obtain a data value for session key 122 by applying an XPath expression on an XML message body or SOAP message body of application-layer message 130, or by applying a regular expression on a non-XML message body of the application-layer message. The use of an XPath expression or a regular expression can be specified administratively in a configuration process that sets configuration parameters for session management logic 140.

In an embodiment, session management logic 140 is coupled to one or more session-based message processing functions 150. The session-based message processing functions 150 perform one or more data processing functions for the networking device 106. Thus, the session-based message processing functions 150 enable the networking device 106 to offload processing certain functions.

In one embodiment, session keys can be used to identify corresponding session objects 124. Each session object 124 is a data structure or data set that comprises values associated with a particular application session. For purposes of illustrating a clear example, FIG. 1 shows only one session key 122 and session object 124, but in a practical embodiment there may be any number of keys and objects, and the use of thousands of keys and objects is specifically contemplated.

In an embodiment, session objects 124 are stored in the session cache 126 in the networking device 126. The session key 122 can be used in keyed lookup operations to locate and retrieve a particular session object 124 from the cache.

Additionally or alternatively, session objects 124 may be stored in a session cache unit 108 that is coupled to one of the networking devices 102, 104, 106 or otherwise accessible within the network 100. With an approach using session cache unit 108, all the networking devices 102, 104, 106 can access the cached session objects. Such an approach may be useful to improve session robustness. For example, when a path among the networking devices that is followed by the application-layer messages changes as a result of link failure or other issues in network 100, then a second networking device can operate with session data that a first networking device originally created, maintaining the integrity of the session. As another example, messages can be routed to other nodes in the network, and the session data or context information can be passed to the receiving nodes along with the messages to provide the receiving nodes with proper context for processing the received messages.

Figure 2:
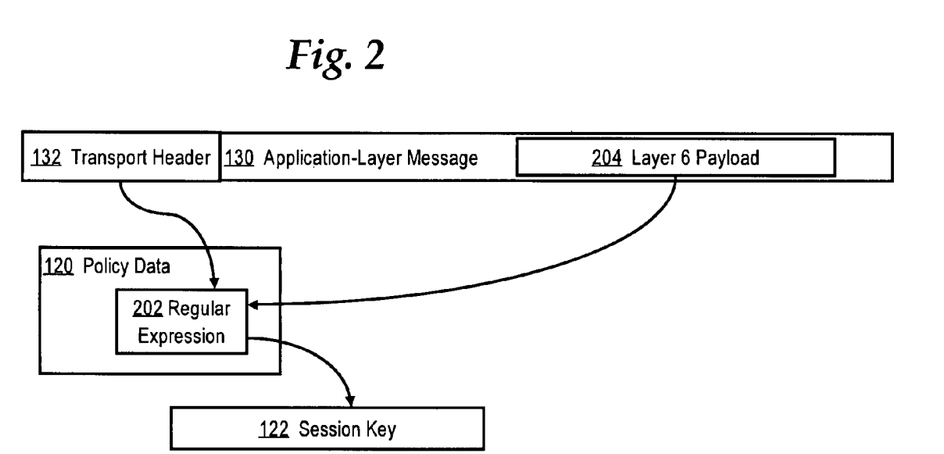
FIG. 2 illustrates a flow of data involved in generating a session key.

FIG. 2 illustrates a flow of data involved in generating a session key. In the example of FIG. 2, the application-layer message 130 comprises a transport header 132 and a Layer 6 payload 204. Policy data 120 includes a regular expression 202. When the message 130 is received in a networking device, the session management logic 140 matches the regular expression 202 to the transport header 132 and to the Layer 6 payload 204. The regular expression acts as a filter and passes result data that is used in creating a session key 122 based on the transport header information and/or the payload information. Thus, matching on both the transport header 132 and the payload 204 is not required, and only one of them may be used to determine the session key.

Figure 3:
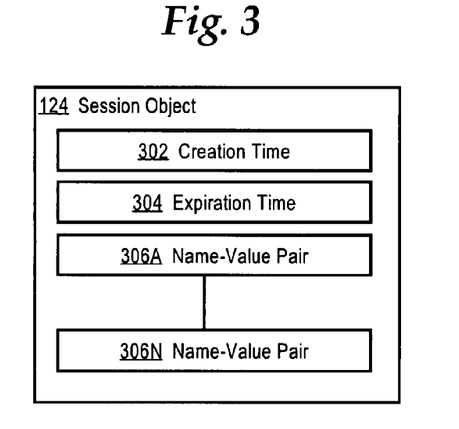
FIG. 3 illustrates a session object.

FIG. 3 illustrates a session object. In an embodiment, a session object 124 comprises a creation time value 302, expiration time value 304, and one or more name-value pairs 306A, 306N that contain substantive session information. The creation time value 302 specifies a time at which the session object was created. The expiration time value 304 indicates a time after which the session object is no longer valid. Applications that receive the session object can test whether the expiration time has passed and, if so, whether the session data can be used. In an alternative embodiment, expiration time value 304 is omitted from the session object, and the life of a session can be based on an idle time value associated with the session. In this approach, if a session object is not used or accessed for a certain time period, then the session object expires.

There may be any number of name-value pairs 306A, 306N, and the names and values stored in the name-value pairs may vary according to the application that uses the session object 124. For example, name-value pairs 306A, 306N may store a value indicating that a specified user has been authenticated, an order identifier for an e-commerce transaction, a nonce that uniquely identifies a session, or other application-specific session data or context information.

Figure 4:
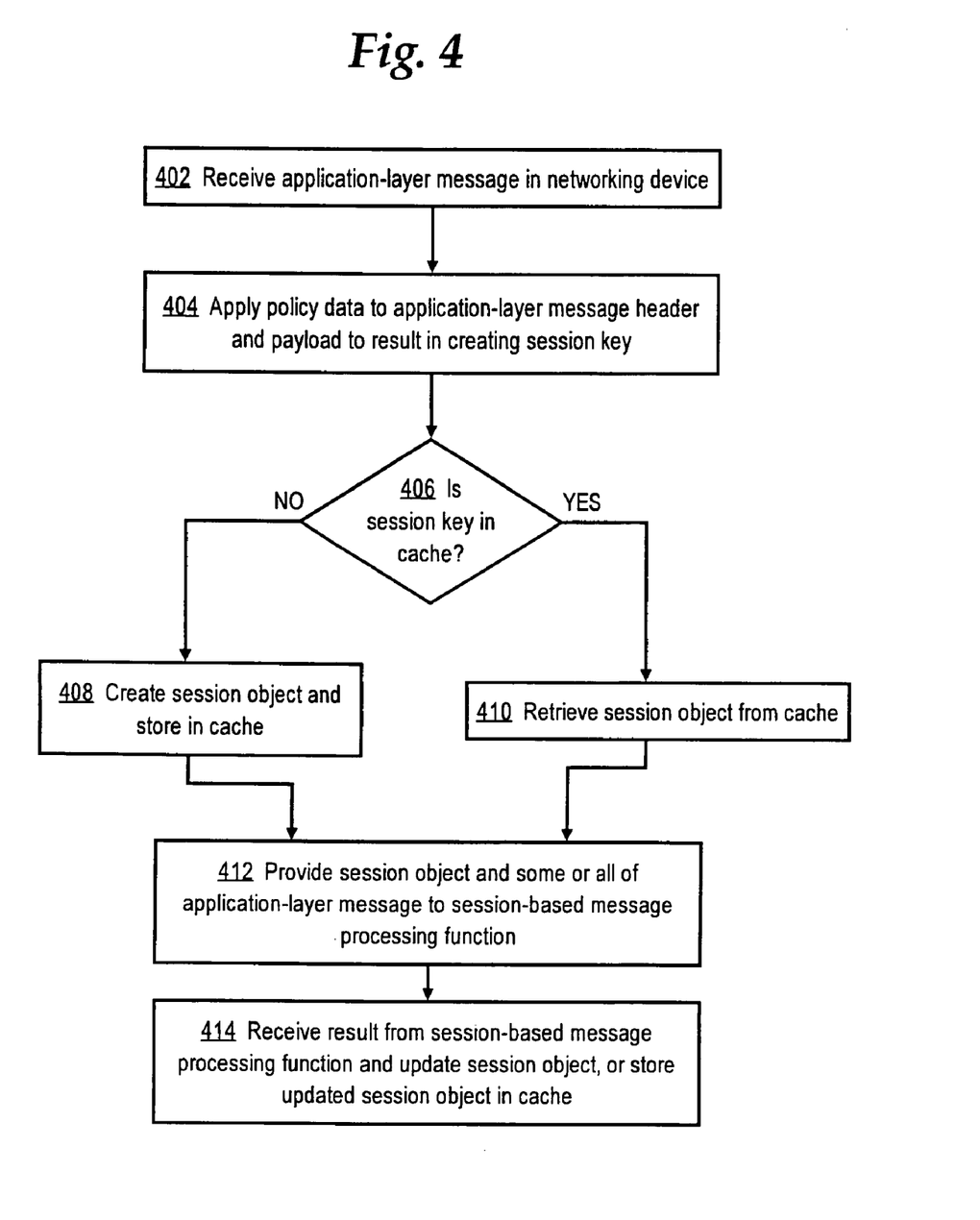
FIG. 4 illustrates a method of performing application-aware session management.

FIG. 4 illustrates a method of performing application-aware session management. In an embodiment, the method of FIG. 4 is implemented in computer program instructions, other software elements, hardware or firmware logic, or other logical elements of session management logic 140.

In step 402, an application-layer message is received in a networking device. In an embodiment, networking device 106 comprises an application-oriented networking (AON) blade from Cisco Systems, Inc. that can receive data frames, segments and packets, assemble the packets into application-layer messages, and perform deep packet inspection, message transformation, and other functions at the application layer.

In step 404, policy data is applied to a header and payload of the application-layer message to result in creating a session key. Step 404 may comprise one or more operations that are defined by policy data. In various embodiments, step 404 may comprise combining a source IP address, destination IP address, source port value, and destination port value of the application-layer message to result in creating the session key; extracting an application message URI and generating the session key based on the URI; applying a regular expression or XPath expression to the application-layer message header or body; extracting a specific header value from a protocol header; or deriving the session key from a specific data value that is in the application-layer message header.

In step 406, a test is performed to determine whether a session object corresponding to the session key created at step 404 is present in a cache. Step 406 can comprise performed a keyed lookup operation in a data table or other repository; cache hit-miss operations are not required. If the session key or a corresponding object are not in the cache, then in step 408, a session object is created and stored in the cache. Otherwise, in step 410 the session object is retrieved from the cache.

In step 412, the session object and some or all of the application-layer message are provided to a session-based message processing function. Alternatively, the session key and the application-layer message, in whole or in part, are provided to a message processing function. The session-based message processing function comprises any functional element that can use the application-layer message to perform a useful function. The session-based message processing function may be hosted within the networking device that is performing the steps of FIG. 4 or may be in another networking device or end station. The session-based message processing function may form a part of the session management logic 140, or may be a separate functional element. The session-based message processing function may be integrated into an operating system or application hosted in the networking device 106.

In step 414, a result is received from the session-based message processing function, and the session object is updated. Alternatively, an updated session object is received from the session-based message processing function, and the updated session object is stored. The update or storage operations may occur with respect to session cache 126 or session cache unit 108.

Step 414 is optional and may be omitted in certain embodiments. Further, operations other than those specifically described herein may be performed. The broad intent of FIG. 4 is to provide a way to obtain session information from an application-layer message within a networking device, and to provide the session information to a functional element that can use that information in performing some data processing function that benefits from session information.

In one application of FIG. 4, a user connects through the networking device 106 to an authentication server, such as a SiteMinder policy server. A user authentication operation is performed, and the networking device 106 receives an application-layer message indicating the results of the authentication. In response, the networking device 106 creates a session key based on the message and creates a session object that is indexed using the session key. The session object stores the results of the authentication operation, and data relating to the authenticated session. Any subsequent application request which requires an authenticated session available for the user can be handled if there is a session available in the session cache, and the presence of a session in the session cache indicates the result of a successful authentication operation.

In another embodiment, the process of FIG. 4 further comprises periodically receiving and storing policy data defining one or more session keys. In an embodiment, session management logic 140, or a management unit separate from networking device 106, supports a configuration interface that enables a user or application to create a new session identification policy type and deploy the policy types on networking devices 102, 104, 106. As a result, new application specific sessions can be created on networking devices 102, 104, 106 without bringing networking devices 102, 104, 106 down. Similarly, any change in session identification policies can be deployed and networking devices 102, 104, 106 can adapt to the new or modified policies.

In an embodiment, policy data 120 specifies policies relating to creating and using session keys. For example, the configuration information can specify that session keys must be based upon a part of an application-layer message that is digitally signed, to ensure that the basis of a session key has not been tampered with. The configuration information can specify that a session key must be derived from an encrypted portion of the application-layer message. This approach can thwart session-based replay attacks from nodes that are positioned as a "man in the middle."

Policy data 120 also can define that session keys are created using data available as a part of protocol headers or data present in application message header or body. As an example, policy data 120 can specify that a session object is created based on a username specified in an HTTP header, or specified in a Username Token in a SOAP message header, and an IP address of the host from which the message originates.

Additionally or alternatively, policy data 120 can specify performing a deep packet inspection using a regular expression or XPath expression. Such policy data 120 can result in finding application-specific context information, and using such information to create session or associated objects that are more useful to applications because the session objects contain more detailed information about a particular message or transaction.

A benefit of the present approach is that sessions can be maintained across multiple hops in a network. For example, when an external session cache unit 108 is used, then all networking devices 102, 104, 106 in a network can update the session cache unit with session keys and session data, and any particular networking device can look up any session at any time and pass session objects to offloaded applications or applications within the networking devices. Thus, an application-layer message flow arriving at any of the networking devices 102, 104, 106 in the network can result in creating a session key that causes retrieval of the correct session object from the session cache unit, even if the particular networking device did not create or originate the session.

Alternatively, a particular networking device can multicast updated session keys and session object data to all other networking devices so that all networking devices can maintain synchronized cached session object data.

Further, session data as provided herein can be used to perform any application function and store necessary contextual information for any application or function of an application. Therefore, applications can be designed in a flexible way based on session information that is created and managed outside the application using declarative session policies.

Still another benefit of the present approach is that when the content of an application message is used to create a session key, the creation of session keys occurs independent of any transport protocol, network protocol, session protocol, or application protocol that is then currently in use. Thus, session keys can be created regardless of whether session management has been implemented in the protocol stacks for IP, TCP, HTTP, etc.

The session policy 120 provides a declarative way to specify different means of what constitutes a session. The session policy 120 can be defined and managed by a centralized external policy server and can be downloaded to networking devices for use in applications that are hosted in the networking devices.

Still another benefit is that externalizing session policies from the applications, as provided herein, enables a networking device to map or broker different kinds of sessions. For example, with the approach herein, an end point application is not required to use HTTP cookies. Instead, an application can define its own form of session object, and logic in the networking devices 102, 104, 106 can transform a received HTTP cookie into the application-specific session object. The logic then provides the session object to a message processing function, which processes a received message using context information in the session object. The message processing function returns a result to the logic in the networking device, and may return the session object with updated context information. If necessary or appropriate, the networking device transforms context information in the session object into an HTTP cookie, which is returned to the application or forwarded to another system or server. In such a scenario, networking devices 102, 104, 106 can facilitate interoperability by brokering session objects. This benefit is notable because HTTP cookies may be commonly used by browsers, but are not typically used by back-end applications such as procurement applications.

The approach herein is particularly useful with applications such as B2B systems, application portals, databases, ERP systems, and Web Services-based applications that are based on stateless application protocols such as SOAP, JMS, and proprietary protocols based on TCP/UDP. In these contexts, traditional HTTP cookie techniques cannot be effectively used.

In almost all of these applications, maintaining session data is essential to support stateful processing of requests and response or for sending one-way messages by end-points. Further, such applications may change their roles asynchronously over a persistent connection. Consequently, these applications rely more and more on communicating stateful session information that is deeply embedded in the message body. Such information may be encoded as in MIME (or DIME) or encrypted in some cases. The present approach allows the user of such systems to declaratively specify the location of such information and how the session is created by pattern matching capabilities such as regular expressions or Xpath expressions.

In still another embodiment, policy data 120 can specify deriving session information based on different pieces of the content of SAP R/3 messages and parts of the context of an SAP R/3 transaction.

The approach herein is more effective and scalable than the traditional transport level models in part because the present approach can use secure content of a message and is not tied to the use of HTTP cookies. Therefore, the present approach can be used with a far wider variety of applications. The present approach does not depend on transport protocol headers, but can use application content instead.

3.0 Implementation Mechanisms—Hardware Overview

Figure 5:
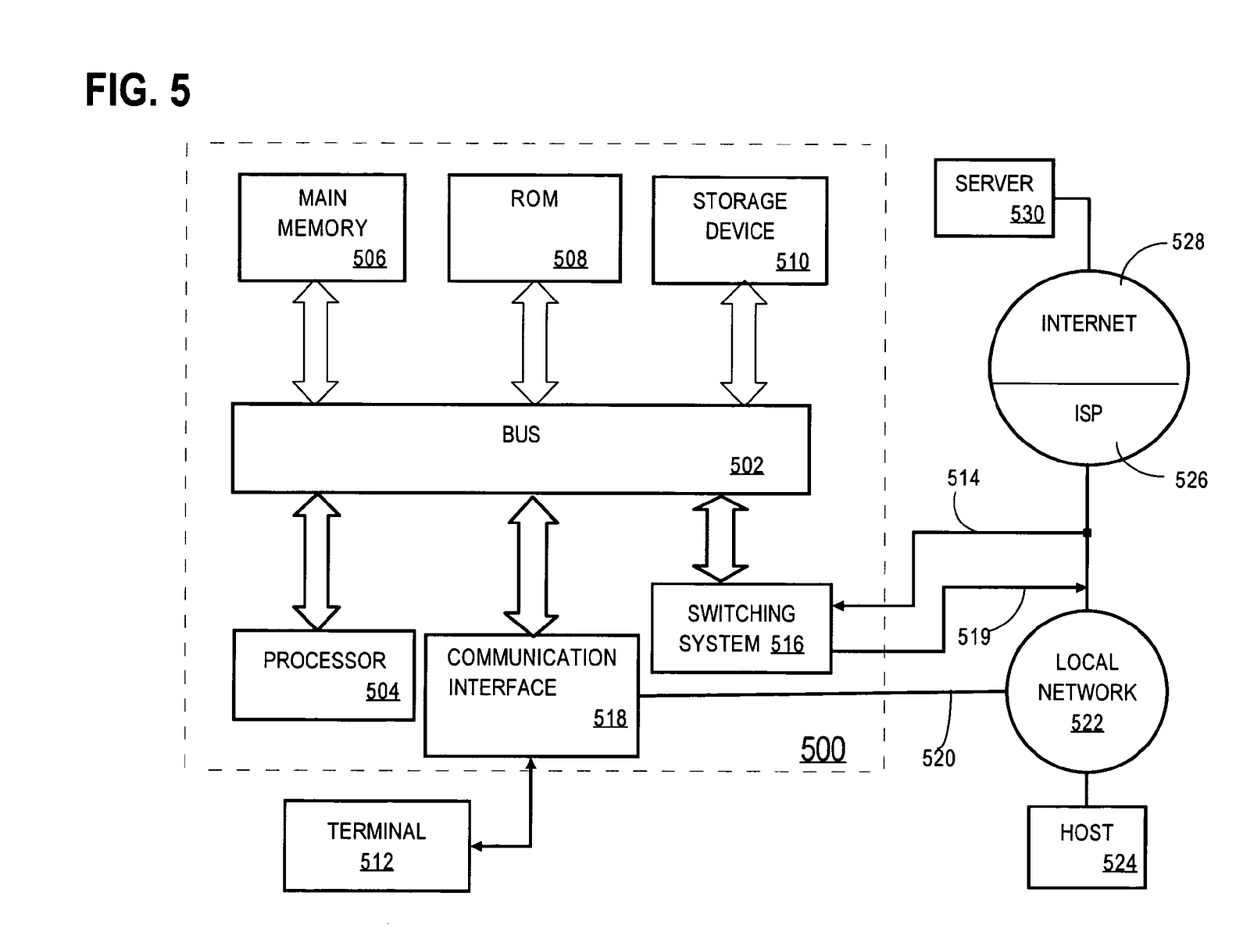
FIG. 5 illustrates a computer system upon which an embodiment may be implemented.

FIG. 5 is a block diagram that illustrates a computer system 500 upon which an embodiment of the invention may be implemented. The preferred embodiment is implemented using one or more computer programs running on a network element such as a router device. Thus, in this embodiment, the computer system 500 is a router.

Computer system 500 includes a bus 502 or other communication mechanism for communicating information, and a processor 504 coupled with bus 502 for processing information. Computer system 500 also includes a main memory 506, such as a random access memory (RAM), flash memory, or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk, flash memory or optical disk, is provided and coupled to bus 502 for storing information and instructions.

A communication interface 518 may be coupled to bus 502 for communicating information and command selections to processor 504. Interface 518 is a conventional serial interface such as an RS-232 or RS-422 interface. An external terminal 512 or other computer system connects to the computer system 500 and provides commands to it using the interface 514. Firmware or software running in the computer system 500 provides a terminal interface or character-based command interface so that external commands can be given to the computer system.

A switching system 516 is coupled to bus 502 and has an input interface 514 and an output interface 519 to one or more external network elements. The external network elements may include a local network 522 coupled to one or more hosts 524, or a global network such as Internet 528 having one or more servers 530. The switching system 516 switches information traffic arriving on input interface 514 to output interface 519 according to pre-determined protocols and conventions that are well known. For example, switching system 516, in cooperation with processor 504, can determine a destination of a packet of data arriving on input interface 514 and send it to the correct destination using output interface 519. The destinations may include host 524, server 530, other end stations, or other routing and switching devices in local network 522 or Internet 528.

The invention is related to the use of computer system 500 for application session management in networking devices. According to one embodiment of the invention, application session management in networking devices is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Communication interface 518 also provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for application session management in networking devices as described herein.

The received code may be executed by processor 504 as it is received, and/or stored in storage device 510, or other non-volatile storage for later execution. In this manner, computer system 500 may obtain application code in the form of a carrier wave.

4.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A networking device, comprising:
   one or more processors;
   an interface configured to receive and transmit data from and to a network;
   policy data configured to specify, for one or more application-layer messages, a session key that uniquely identifies an application session associated with the application-layer messages;
   logic encoded in one or more media for execution and when executed operable to receive a particular application-layer message through the interface, generate a particular session key for the particular application-layer message based on the policy data, and provide the particular session key to a message processing function;
   wherein the policy data comprises a regular expression configured to match two or more data fields in a payload of the particular application-layer message, and
   wherein the logic is operable to generate the particular session key for the particular application-layer message using a result of matching the regular expression to the data fields by extracting and combining data from the two or more data fields that match the regular expression and generating the particular session key from the combined data.

2. The networking device of claim 1, comprising a switch or a router for use in a packet-switched network.

3. The networking device of claim 1, further comprising a cache configured to store a plurality of session keys for different application sessions.

4. The networking device of claim 1, further comprising the message processing function.

5. The networking device of claim 1, wherein the logic when executed is operable to generate a session object representing the application session and to provide the session object to the message processing function.

6. The networking device of claim 1, wherein the policy data comprises an XPath expression configured to match two or more data fields in an Extensible Markup Language (XML) payload of the application-layer messages, and wherein the logic is operable to generate the particular session key for the particular application-layer message using a result of matching the XPath expression to the data fields.

7. The networking device of claim 1, wherein the logic when executed is operable to obtain context information from the particular application-layer message, transform the context information into a session object that is associated with the particular session key, and provide the session object to the message processing function.

8. The networking device of claim 7, wherein the context information comprises an HTTP cookie.

9. The networking device of claim 7, wherein the logic when executed is operable to receive an updated session object from the message processing function, obtain updated context information of the updated session object, and provide the updated context information in a response to the particular application-layer message.

10. Logic encoded in one or more computer-readable volatile or non-volatile storage media storing instructions for execution which when executed by one or more processors are operable to:

receive a particular application-layer message through an interface of a networking device;

generate a particular session key for the particular application-layer message based on policy data, wherein the policy data is configured to specify, for two or more application-layer messages, a session key that uniquely identifies an application session associated with the application-layer messages; and provide the particular session key to a message processing function;

wherein the policy data comprises a regular expression configured to match two or more data fields in a payload of the particular application-layer message, and wherein the logic is operable to generate the particular session key for the particular application-layer message using a result of matching the regular expression to the data fields by extracting and combining data from the two or more data fields that match the regular expression and generating the particular session key from the combined data.

11. The logic of claim 10, wherein the logic when executed is operable to create a cache configured to store a plurality of session keys for different application sessions.

12. The logic of claim 10, further comprising the message processing function.

13. The logic of claim 10, wherein the logic when executed is operable to generate a session object representing the application session and to provide the session object to the message processing function.

14. The logic of claim 10, wherein the policy data comprises an XPath expression configured to match two or more data fields in an Extensible Markup Language (XML) payload of the application-layer messages, and wherein the logic is operable to generate the particular session key for the particular application-layer message using a result of matching the XPath expression to the data fields.

15. The logic of claim 10, wherein the logic when executed is operable to obtain context information from the particular application-layer message, transform the context information into a session object that is associated with the particular session key, and provide the session object to the message processing function.

16. The logic of claim 15, wherein the context information comprises an HTTP cookie.

17. The logic of claim 15, wherein the logic when executed is operable to receive an updated session object from the message processing function, obtain updated context information of the updated session object, and provide the updated context information in a response to the particular application-layer message.

18. An apparatus comprising:

one or more processors;

an interface configured to receive and transmit data from and to a network;

policy data configured to specify, for one or more application-layer messages, a session key that uniquely identifies an application session associated with the application-layer messages;

means for receiving a particular application-layer message through the interface;

means for generating a particular session key for the particular application-layer message based on the policy data; and means for providing the particular session key to a message processing function;

wherein the policy data comprises a regular expression configured to match two or more data fields in a payload of the particular application-layer message, and wherein the particular session key for the particular application-layer message is generated using a result of matching the regular expression to the data fields by extracting and combining data from the two or more data fields that match the regular expression and generating the particular session key from the combined data.

19. The apparatus of claim 18, comprising a switch or a router for use in a packet-switched network.

20. The apparatus of claim 18, further comprising means for storing a plurality of session keys for different application sessions.

21. The apparatus of claim 18, further comprising the message processing function.

22. The apparatus of claim 18, further comprising means for generating a session object representing the application session and means for providing the session object to the message processing function.

23. The apparatus of claim 18 wherein the policy data comprises an XPath expression configured to match two or more data fields in an Extensible Markup Language (XML) payload of the application-layer messages, and further comprising means for generating the particular session key for the particular application-layer message using a result of matching the XPath expression to the data fields.

24. The apparatus of claim 18, further comprising means for obtaining context information from the particular application-layer message, transforming the context information into a session object that is associated with the particular session key, and providing the session object to the message processing function.

25. The apparatus of claim 18, wherein the context information comprises an HTTP cookie.

26. The apparatus of claim 18, further comprising means for receiving an updated session object from the message processing function, obtaining updated context information of the updated session object, and providing the updated context information in a response to the particular application-layer message.

27. A method, comprising:
creating and storing policy data that is configured to specify, for one or more application-layer messages, a session key that uniquely identifies an application session associated with the application-layer messages;
receiving a particular application-layer message through an interface of a networking device, wherein the interface is configured to receive and transmit data from and to a network;
generating a particular session key for the particular application-layer message based on the policy data; and
providing the particular session key to a message processing function;
wherein the policy data comprises a regular expression configured to match two or more data fields in a payload of the particular application-layer message, and
wherein the particular session key for the particular application-layer message is generated using a result of matching the regular expression to the data fields by extracting and combining data from the two or more data fields that match the regular expression and generating the particular session key from the combined data;
wherein the method is performed by one or more processors.

28. The method of claim 27, wherein the policy data comprises a regular expression configured to match two or more data fields in a payload of the application-layer messages, and further comprising generating the particular session key for the particular application-layer message using a result of matching the regular expression to the data fields.

29. The method of claim 27, wherein the policy data comprises an XPath expression configured to match two or more data fields in an Extensible Markup Language (XML) payload of the application-layer messages, and further comprising generating the particular session key for the particular application-layer message using a result of matching the XPath expression to the data fields.

30. The method of claim 27, further obtaining context information from the particular application-layer message, transforming the context information into a session object that is associated with the particular session key, and providing the session object to the message processing function.

31. The method of claim 27, wherein the context information comprises an HTTP cookie.

32. The method of claim 27, further comprising receiving an updated session object from the message processing function, obtaining updated context information of the updated session object, and providing the updated context information in a response to the particular application-layer message.

* * * * *